United States Patent [19]

Wood

[11] 4,158,087

[45] Jun. 12, 1979

[54] URETHANE FOAMS HAVING LOW RESILIENCY

[75] Inventor: Louis L. Wood, Rockville, Md.

[73] Assignee: W. R. Grace & Co., New York, N.Y.

[21] Appl. No.: 801,079

[22] Filed: May 27, 1977

[51] Int. Cl.$^2$ .................... C08G 18/14; C08G 18/62
[52] U.S. Cl. .................................... 521/137; 521/905
[58] Field of Search ................ 260/2.5 BE; 521/137

[56] References Cited

U.S. PATENT DOCUMENTS

| | | | |
|---|---|---|---|
| 2,993,013 | 7/1961 | Wolfe, Jr. | 260/77.5 A |
| 3,600,340 | 8/1971 | Patton, Jr. et al. | 260/2.5 BE |
| 3,646,178 | 2/1972 | Traubel et al. | 260/2.5 BE |
| 3,755,211 | 8/1973 | Fabris et al. | 260/2.5 BE |
| 3,781,231 | 12/1973 | Janssen et al. | 260/2.5 BE |
| 3,869,413 | 3/1975 | Blankenship | 260/2.5 BE |
| 3,968,089 | 7/1976 | Cuscurida et al. | 260/2.5 BE |
| 4,014,846 | 3/1977 | Ramlow et al. | 260/2.5 BE |
| 4,049,590 | 12/1977 | Falkenstein et al. | 260/2.5 BE |

*Primary Examiner*—Howard E. Schain
*Assistant Examiner*—R. A. White
*Attorney, Agent, or Firm*—Richard P. Plunkett; Philip M. Pippenger

[57] ABSTRACT

Disclosed herein are hydrophilip polyether urethane foams having reduced resiliency and prepared by reacting a polyoxyalkylene urethane prepolymer containing at least 40 mole percent of oxyethylene units; water; and at least about 50 parts, based on the weight of the prepolymer, of a synthetic polymer latex.

10 Claims, No Drawings

URETHANE FOAMS HAVING LOW RESILIENCY

BACKGROUND OF THE INVENTION

The present invention relates to polyurethane foams having reduced resiliency, i.e. foams of the invention when compressed return to their original shape; however, the return process takes place slowly. This property of reduced resiliency enables the foams to be used in shock-absorbing and cushioning applications where it is desirable to stop a moving object without rebound or bouncing. The foams are also suitable for other applications such as earplugs, tampons, and packaging where it is necessary to compress the foam into a small size and, once compression is removed, it is desired for the foam to return slowly to its original size. The pressure exerted by the foam to return to its original size is desirable in that the pressure tends to hold the foam in place. Many conventional polyurethane foams regain their original size after compression within a fraction of a second. Foams of the invention take considerably longer.

Latices have been employed in combination with polyurethane precursors in preparing polyurethane foams. For example, U.S. Pat. No. 3,755,211 describes a foam formed by reacting a polyhydroxy compound with an organic polyisocyanate, water and a latex. Up to 20 parts of latex can be employed based on the weight of the polyhydroxy compound.

U.S. Pat. No. 2,933,013 describes both one-shot and prepolymer processes wherein a latex is mixed with a prepolymer with the water portion of the latex reacting with the NCO groups of the prepolymer to provide foaming. The latex may be employed at levels up to 10% based on the weight of the prepolymer. The resulting foams are said to have improved resilience and load bearing.

U.S. Pat. No. 3,582,499 describes a process wherein a synthetic polymer latex is foamed in the presence of a polyisocyanate which serves to crosslink the latex particles to improve physical properties of the resulting foam. The polyisocyanate (e.g. reduced methylene diisocyanate) is added during the foaming cycle and reacts with active hydrogen groups contained on the latex particles.

DESCRIPTION OF THE INVENTION

By the present invention flexible hydrophilic polyurethane foams having reduced resiliency are obtained by reacting (A) a polyoxyalkylene urethane prepolymer containing at least 40 mole percent of ethylene oxide (i.e. oxyethylene) units in the oxyalkylene portion of the prepolymer; (B) water; and (C) from about 40 to about 150 parts by weight (solids basis) per 100 parts by weight of the prepolymer, of a synthetic polymer latex. The amount of water employed is from about 20 to about 250 parts, based on the weight of the prepolymer.

The foams of the invention are prepared by admixing a urethane prepolymer, water and synthetic polymer latex. Conveniently all or part of the water described above is contained in the latex and may be added as part of the latex. If desired, however, water can be added separately to supplement the amount of water already present in the latex. Where a latex is used which contains undesirably low levels of solids, the water can be stripped from the latex before admixture with the prepolymer. In practice it is possible to employ almost unlimited quantities of water in preparing foams, i.e. the combination of latex and prepolymer can be immersed in water to obtain foaming. In practice it is believed desirable to employ from about 20 to about 250 parts/wt. of water per 100 parts/wt. of prepolymer polyisocyanate. As set forth above, the lower limit on the amount of latex (solids basis) to be employed is about 40 parts. Below this level the resiliency of the foams is believed to be undesirably high. At levels above about 150 parts, the rebound of the foams is decreased to an undesirable level.

The foams of the invention can be employed without using surfactants other than those present in the latex. However, it is desirable to follow conventional practice and use surfactants to control cell size and promote admixture of the latex and prepolymer phases. The surfactant can be dispersed in any water employed separately in the foaming reaction or can be added to the latex prior to admixture with the prepolymer. It is also possible to admix the latex and prepolymer phases and simultaneously add the surfactant. From about 0.05 to about 5.0 parts of surfactant based on the weight of the prepolymer are employed.

Silicone surfactants (e.g. DC198 by Dow Corning) have been employed successfully to date. However, from past experience and a knowledge of conventional surfactant technology, other surfactants believed to be usable in the invention include Union Carbide L-520 silicone surfactant and similar analogues; Wyandotte nonionic surfactants Pluronic ® L-62, P-75, F-77, L-64; and ICI United States, nonionic surfactant BRIJ ® 72. The nature of the surfactant employed is not part of the present invention. Employing technology, the surfactants mentioned above as well as others readily available can be run in several preliminary trials to determine the optimum influence on cell size, structure and other characteristics of the foam. The present invention is concerned primarily with providing foams having desirable resiliency.

The synthetic polymer latices employed have a solids content of from about 20 to about 65 weight % and are formed by polymerizing a monomer having at least one carbon-carbon double bond. Methods of polymerizing such monomers and preparing latices therefrom are well-known. For example, see "Synthetic Rubber", Whitty, published by John Wiley and Sons, New York, 1954. Representative latices include styrene-butadiene, chlorinated polyethylene, butadiene-methacrylate, butadiene-acrylonitrile. The styrene-butadiene and acrylic (i.e. copolymer latices of an acrylic monomer such as methacrylic acid, acrylic acid, acrylonitrile, acrylic acid esters and amides with another monomer such as butadiene or 2-chlorobutadiene-1,3) are preferred. The particle size of appropriate latices is from about 300 to about 3000A.

Oxyalkylene Prepolymers

Polyether polyurethane prepolymers employed are hydrophilic, i.e. at least 40 mole % of the oxyalkylene units in the prepolymer backbone are oxyethylene units with the balance being oxypropylene, oxybutylene or other oxyalkylene units. In the resulting polyurethane foams, the branch-points of the polymer chains are connected by essentially linear polyoxyalkylene chains containing at least 40 mole % of oxyethylene units (excluding initiators at branch-points) as described above. Where the oxyethylene content is from about 60 to 75 mole %, it may be desirable to use a surfactant such as those specified earlier to promote dispersion of the prepolymer in water prior to foaming.

As described above, the foams of the present invention are based on the prepolymer technique. Suitable prepolymers are prepared by capping a polyoxyalkylene polyol with an excess of polyisocyanate, e.g. toluene diisocyanate. Prior to capping, the polyol should have a molecular weight of from about 200 to about 20,000 and preferably from about 600 to about 6,000. The hydroxy functionality of the polyol and the corresponding isocyanate functionality following capping is from 2 to about 8. If foams are formed from prepolymers with an isocyanate functionality of about 2, the resulting foam is essentially linear and does not have as much tensile strength as crosslinked foams. Accordingly, if the isocyanate functionality is about 2, a crosslinker can be employed although the linear non-crosslinked foams are operable in the present invention. Suitable crosslinkers are well-known in the polyurethane art and include by way of example tolylene-2,4,6-triamine, ethylene diamine, diethanolamine, diethylenetriamine, triethylene-tetramine, tetraethylenepentamine, and ethanolamine.

Examples of suitable polyols (to be capped with polyisocyanates) include: (A) essentially linear polyols formed for example by reaction of ethylene oxide with ethylene glycol as an initiator. As discussed above, mixtures of ethylene oxide with other alkylene oxides can be employed so long as the mole percent of ethylene oxide is at least 40 percent. Also as stated, it may be desirable to use crosslinkers with these systems in which case the crosslinker can be included in the water into which the prepolymer is dispersed. Where the linear polyethers are mixtures of ethylene oxide with, e.g. propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m. w. about 1,000) with trimethylolpropane, trimethylolethane or glycerine. This mixture can be subsequently reacted with excess polyisocyanate to provide a prepolymer useful in the invention. Alternatively, the linear or branched polyols, (e.g. polyethylene glycol) can be reacted separately with excess polyisocyanate. The initiator, e.g. trimethylolpropane, can also be separately reacted with polyisocyanate. Subsequently, the two capped materials can be combined to form the prepolymer.

Suitable polyisocyanates useful in preparing prepolymers include toluene-2,4-diisocyanate, toluene-2,6-diisocyanate, commercial mixtures of toluene2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluenetriisocyanate, and p,p',p''-triphenylmethane triisocyanate.

Suitable initiators useful in preparing prepolymers include propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)methylpentanediol-1,5, 1,1,1-tris[(2-hydroxyethoxy)methyl]ethane, 1,1,1-tris[(2-hydroxypropoxy)methyl]propane, triethanolamine, triisopropanolamine, resorcinol, pyrogallol, phloroglucinol, hydroquinone, 4,6-di-tertiarybutyl catechol, and catechol.

EXAMPLES

To illustrate the invention, foams were prepared by dispersing a surfactant in a latex. The latex was admixed with a urethane prepolymer in a one-quart waxed paper cup using an electric stirrer fitted with a 1.5 inch disc-type paint mixer. Each foam was then removed from its respective cup and dried at 70° C. for 16 hours.

The foams were tested for various properties as set forth in Table I. Control foams 1 and 2 were tested only for dry recovery time. The data demonstrates that use of the latex greatly increases the recovery time of the foam. For Examples 3 and 6, foam recovery time was relatively fast yet was still 400% (Example 3) and 200% (Example 6) of the respective control. It is believed that the recovery times of Examples 3 and 6 could be increased still further by increasing the amount of latex employed. Examples 1, 2, 4 and 5 are even more superior in relation to their respective controls.

TABLE I

| Example | Formulation | | Dry Density (Lbs/Ft³) | Dry Recovery Time (Seconds) | Modulus (psi) | | Tensile St. (psi) | | % Elongation | | Tear St. (Lbs/In) | |
|---|---|---|---|---|---|---|---|---|---|---|---|---|
| | | | | | Dry | Wet | Dry | Wet | Dry | Wet | Dry | Wet |
| 1 | Prepolymer B | 80g | 5.6 | 16 | 10 | 10 | 32 | 17 | 647 | 366 | 2.5 | 0.87 |
| | Latex 1 | 80g | | | | | | | | | | |
| | Surfactant | 4g | | | | | | | | | | |

TABLE I-continued

| Example | Formulation | | Dry Density (Lbs/Ft³) | Dry Recovery Time (Seconds) | Modulus (psi) Dry | Modulus (psi) Wet | Tensile St. (psi) Dry | Tensile St. (psi) Wet | % Elongation Dry | % Elongation Wet | Tear St. (Lbs/In) Dry | Tear St. (Lbs/In) Wet |
|---|---|---|---|---|---|---|---|---|---|---|---|---|
| 2 | Prepolymer B | 80g | 5.5 | 15 | 11 | 7 | 31 | 12 | 640 | 284 | 1.9 | 1.0 |
|   | Latex 2 | 80g | | | | | | | | | | |
|   | Surfactant | 4g | | | | | | | | | | |
| 3 | Prepolymer B | 80g | 5.9 | 2 | 14 | 13 | 31 | 16 | 528 | 216 | 3.4 | 1.2 |
|   | Latex 3 | 80g | | | | | | | | | | |
|   | Surfactant | 4g | | | | | | | | | | |
| Control 1 | Prepolymer B | 80g | | <0.5 | | | | | | | | |
|   | Surfactant | 4g | | | | | | | | | | |
|   | H₂O | 80g | | | | | | | | | | |
| 4 | Prepolymer A | 80g | 4.7 | 12 | 27 | 16 | 44 | 20 | 379 | 212 | 2.5 | 1.3 |
|   | Latex 1 | 80g | | | | | | | | | | |
|   | Surfactant | 4g | | | | | | | | | | |
| 5 | Prepolymer A | 80g | 5.5 | 12 | 22 | 13 | 46 | 17 | 516 | 234 | 2.2 | 1.1 |
|   | Latex 2 | 80g | | | | | | | | | | |
|   | Surfactant | 4g | | | | | | | | | | |
| 6 | Prepolymer A | 80g | 7.3 | 1 | 52 | 26 | 45 | 21 | 278 | 161 | 4.1 | 1.1 |
|   | Latex 3 | 80g | | | | | | | | | | |
|   | Surfactant | 4g | | | | | | | | | | |
| Control 2 | Prepolymer A | 80g | | <0.5 | | | | | | | | |
|   | Surfactant | 4g | | | | | | | | | | |
|   | H₂O | 80g | | | | | | | | | | |

Prepolymer Preparations

Prepolymer A described in Table I was prepared by admixing 2 molar equivalents of polyethylene glycol having an average molecular weight of 1,000 (PEG—1,000) and one molar equivalent of trimethylolpropane (TMOP). The admixture was dried at 100°–110° C. under a pressure of 5–15 Torr to remove water. The resulting dried mixture was slowly added over a period of about one hour to a vessel containing 6.65 molar equivalents of toluene diisocyanate (TDI)[1] while stirring the TDI and polyol mixture. The temperature was maintained at 60° C. The mixture was maintained at 60° C. with stirring for three additional hours. Then an additional 1.05 molar equivalent of TDI was added with stirring over a period of about one hour while maintaining the temperature at 60° C. The final reaction mixture contained a 10% molar excess of TDI. All hydroxyl groups were capped with isocyanate and some chain extension occurred because of crosslinking of the polyols with TDI.

[1] The TDI was an 80/20 mixture of the 2,4 and 2,6 isomers.

Prepolymer B described in Table I was prepared similarly to Prepolymer A with the exception that 0.66 molar equivalents of TMOP were employed for every 2 molar equivalents of PEG—1,000. In the initial capping reaction with TDI, the amount of TDI employed was about 92% of that theoretically required to cap all hydroxyl groups in the polyol mixture. Subsequently, an additional 13% TDI was added to provide a theoretical molar excess of about 5%.

Latices Employed

In Table I, Latex 1 is a soft styrene/butadiene latex containing 52% solids designated as Latex LX430 (MTP Kasei). Latex 2 is a soft, self-crosslinking acrylic latex containing 60% solids designated as UCAR 874 (Union Carbide). Latex 3 is a carboxylated styrene (67)/butadiene (33) latex containing 55% solids. The surfactant is a silicone surfactant designated as DC198 (Dow Corning).

Test Methods

The tests employed to generate the dry test measurements are set forth below. The corresponding wet test measurements were obtained by employing an identical foam test specimen which had been saturated with water prior to testing.

Dry Recovery: The dried (16 hours, 70° C.) foam at 25° C. is compressed along its foam rise direction to 1/5 its original length (1") for one minute. Upon release, the time required for the foam to regain its original dimension (1") is noted.

Modulus: Measured at 1% elongation, ASTM D1564
Tensile: Measured at failure, ASTM D1564
% Elongation: Measured at failure, ASTM D1564
Tear Strength: ASTM D1564

What is claimed is:

1. A flexible hydrophilic polyurethane foam comprising the reaction product of (1) an NCO terminated polyoxyalkylene urethane prepolymer containing at least 40 mole percent of ethylene oxide units in the oxyalkylene portion of the prepolymer, (2) from about 40 to about 150 parts by weight on a solids basis based on 100 parts by weight of said prepolymer of an aqueous latex of a synthetic polymer having a solids content from about 20 to about 65 weight percent and (3) any additional water necessary to obtain a weight ratio of water to prepolymer from about 20 to 250:100 respectively.

2. A foam as in claim 1 wherein the latex is a styrene butadiene latex.

3. A foam as in claim 1 wherein the latex is an acrylic latex.

4. A foam as in claim 1 wherein the prepolymer is an admixture of polyoxyethylene glycol with a monomeric alcohol having 3 hydroxyl groups per mole and wherein the hydroxyl groups of the glycol and alcohol are capped with a polyisocyanate.

5. A foam as in claim 4 wherein the alcohol is trimethylolpropane.

6. The process of preparing flexible hydrophilic polyurethane foams which comprises adding to an NCO terminated polyoxyalkylene urethane prepolymer containing at least 40 mole percent of ethylene oxide units in the oxyalkylene portion of the prepolymer, (1) from about 40 to about 150 parts by weight on a solids basis based on 100 parts by weight of said prepolymer of an aqueous latex of a synthetic polymer having a solids content from about 20 to about 65 weight percent and (2) any additional water necessary to obtain a weight ratio of water to prepolymer from about 20 to 250:100 respectively.

7. A process as in claim 6 wherein the latex is a styrene butadiene latex.

8. A process as in claim 6 wherein the latex is an acrylic latex.

9. A process as in claim 6 wherein the prepolymer is an admixture of polyoxyethylene glycol with a monomeric alcohol having 3 hydroxyl groups per mole and wherein the hydroxyl groups of the glycol and alcohol are capped with a polyisocyanate.

10. A process as in claim 4 wherein the alcohol is trimethylolpropane.

* * * * *